Aug. 30, 1932.  F. MARYOTT  1,875,072
SUGAR BEET TOPPER
Filed Sept. 29, 1930  2 Sheets-Sheet 1
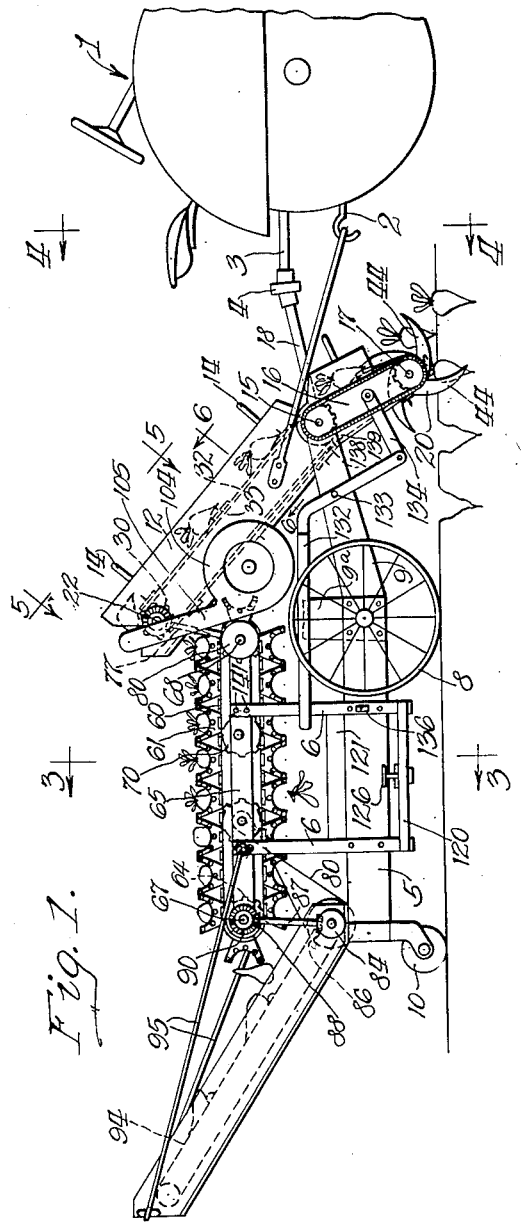
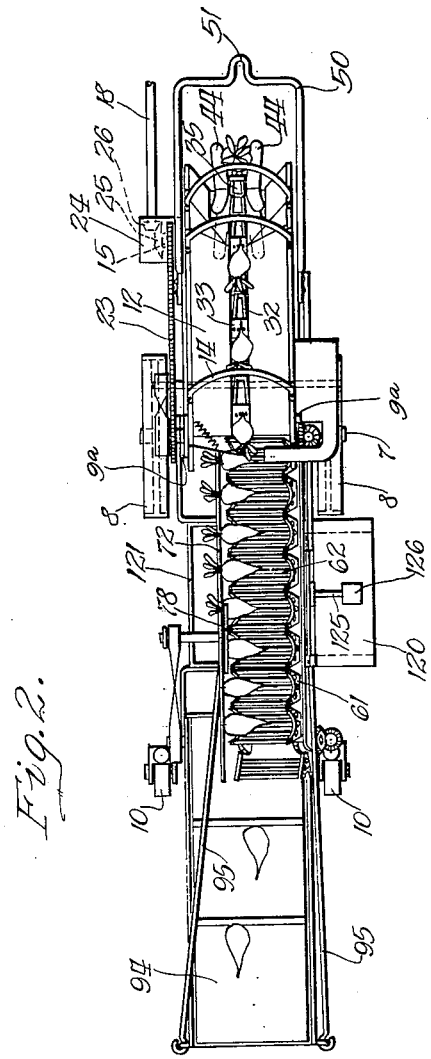
Inventor
Fred Maryott
By Brown, Jackson, Boettcher & Dienner
Attys Aug. 30, 1932.  F. MARYOTT  1,875,072

SUGAR BEET TOPPER

Filed Sept. 29, 1930   2 Sheets-Sheet 2

Inventor
Fred Maryott
By Brown, Jackson, Boettcher & Dienner
Attys

Patented Aug. 30, 1932

1,875,072

UNITED STATES PATENT OFFICE

FRED MARYOTT, OF COZAD, NEBRASKA, ASSIGNOR TO CYRUS A. BLACK, OF KEARNEY, NEBRASKA

SUGAR BEET TOPPER

Application filed September 29, 1930. Serial No. 484,948.

The present invention relates generally to agricultural implements and more particularly to beet toppers which are machines for harvesting beets or like crops and are usually provided with means for removing the beets from the ground and also with means for severing the tops from the beets.

More specifically, the principal object of the present invention is to provide a machine of the above named type having improved and simplified means for receiving the beets after they have been dug from the ground and for removing the tops from the beets.

Another object of the present invention is to provide an improved means for moving the beets into cooperation with the cutting means for removing the tops so that a comparatively large acreage of beets can be harvested in one day.

Another object of the present invention is to provide a machine which is strong and sturdy, is simple and efficient in operation.

Other objects and advantages of the present invention will be apparent to those skilled in the art after a consideration of the following detailed description of the preferred embodiment, taken in conjunction with the accompanying drawings in which:

Figure 1 is a vertical side elevation of my improved beet harvester;

Figure 2 is a top plan view of the harvester shown in Figure 1;

Figure 3:
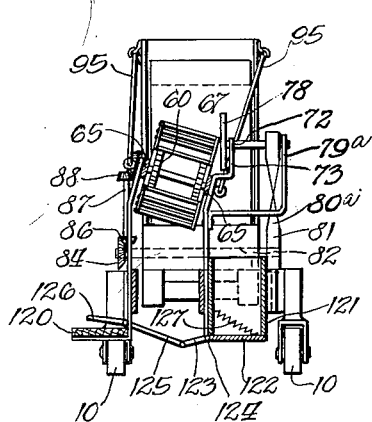
Figure 3 is a sectional view taken substantially along the lines 3—3 of Figure 1.

Referring now to the drawings, the reference numeral 1 indicates a farm tractor of the usual type having a draw bar 2 and a power take-off shaft 3 provided with one or more universal joints 4 for the purpose of flexibly transmitting power from the motor of the tractor to the machinery drawn by the tractor.

My improved beet harvester is seen to comprise a wheel supported frame 5 having a plurality of uprights 6 secured to the frame 5 in any desired manner, as by bolts and the like. The forward end of the frame 5 may have journaled therein an axle 7 upon which are mounted front supporting wheels 8 of any desired type. The rear portion of the frame may be provided with caster wheels 10 having vertical journaled support in the frame 5.

Projecting upwardly and forwardly from the forward portion of the frame 5 are a plurality of frame members 9 and 9a which carry at their upper ends the elevator frame 12, as best shown in Figure 1. The members 9 and 9a are suitably braced and connected with the frame 5 so as to be rigidly supported thereby and, in turn, to rigidly support the elevator frame 12. Suitable braces 14 reinforce and strengthen the elevator frame 12.

The lower end of the elevator frame 12 carries a rotatable shaft 15 upon which is hinged a lower frame section 16 having at its lowermost end a shaft 17 journaled therein and carrying the beet lifter or puller by which the beets are removed from the ground. This beet puller or lifter is designated by the reference character 20 in Figure 1 and will be described in greater detail later.

The upper end of the elevator frame 12 has journaled therein a rotatable shaft 22 extending at either end beyond the elevator frame proper. One end of the shaft 22 is provided with a sprocket over which is trained a chain 23, see Figure 2, which extends downwardly along the elevator frame 12 where it is trained about a sprocket wheel fastened to the shaft 15, journaled in the lower end of the elevator frame 12. This shaft 15 has a bevel gear connection with a shaft 18 which is adapted to be connected to the power take-off shaft 3 of the tractor in the usual manner. If desired, the bevel gear connection between the shafts 15 and 18 may be enclosed within a dirt and grease tight housing 24.

While I have described the lower elevator frame 16 as hinged to the upper elevator frame 12 by means of the shaft 15 it is to be understood that any other means for hingedly connecting the two elevator frames together may be employed if desired. The location of the shaft 15, however, provides a convenient means for hingedly connecting these elevator frames together. It is to be understood that the rotation of the shaft 15 in no wise affects the hinged connection between these frames 12 and 16. The bevel gearing in the housing 24 may comprise a gear 25 connected with the shaft 15 and driven by a pinion 26 mounted on the end of the power take-off shaft 18. My invention also contemplates hingedly connecting the frames 12 and 16 together by other means and mounting the bevel gear 25 together with the associated sprockets driving the sprocket 23 on a shaft or stud independently secured to the frame 12.

A drag chain sprocket 30 is fixedly secured to the central portion of the shaft 22 and is adapted to drive the drag chain 32, which is preferably provided with a number of beet engaging arms or pins 33 secured to certain of the links of the drag chain 32. The drag chain 32 rides over an idle sprocket (not shown) mounted on the shaft 15 and continues downwardly and is trained over the sprocket wheel 35 secured to and forming a part of the beet puller or lifter 20.

Figure 5:
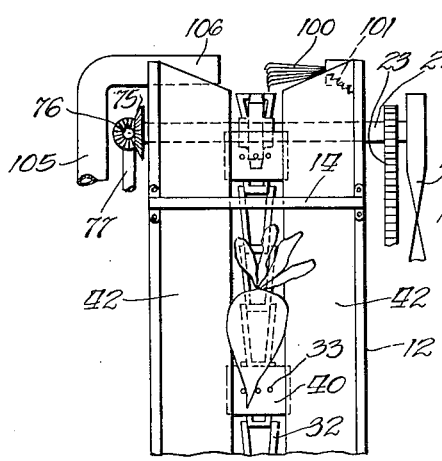
Figure 5 is a fragmentary detail view on an enlarged scale corresponding to the lines 5—5 of Figure 1, showing the upper end of the beet elevator which receives the beets from the lifter and elevates them to the troughs of the moving or revolving table.
Figure 6:
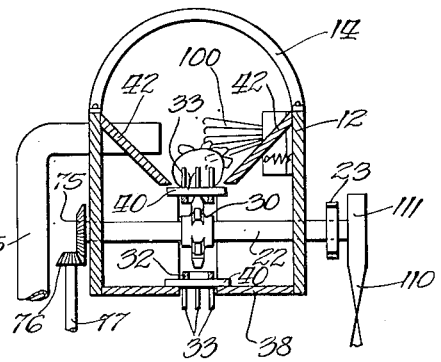
Figure 6 is a cross sectional view of the elevator taken substantially along the lines 6—6 of Figure 1.

As best shown in Figure 6 the elevator frame 12 includes a slotted bottom portion 38 through which the pins or arms 33 are adapted to extend but upon which the lower reach of the chain 32 is supported. The pins 33 may be carried by plates 40 secured in any manner desired to the links or the chain 32. As shown in Figures 5 and 6 the plates 40 are wider than the slots in the bottom member 38 and therefore serve as means for supporting the lower reach of the chain 32. The elevator frame 12 also includes inclined sides 42 which tend to cause the beets to remain in engagement with the pins 33.

The beet lifter 20 is formed with a plurality of pairs of rigid lifting arms 44 curved as shown in Figures 1 and 2. The arms 44 of each pair are spaced apart wider at their upper ends than at their inner ends, thereby forming in effect a V-shaped member for engaging the beets and lifting them from the ground. Preferably, the arms 44 are removable for convenient repair or replacement.

The operation of the mechanism so far described is substantially as follows. Power from the motor of the tractor 1 is transmitted to shafts 3 and 18 to the beveled gearing 25, 26 and thence by means of the sprocket chain 23 to the upper transverse shaft 22. This shaft 22 revolves in a counter clockwise direction as viewed in Figure 1 and causes the sprocket 30 to drive the chain 32 so that the upper run thereof moves in an upwardly and rearwardly direction, thereby elevating the beets engaged by the drag chain 32 and the pins 33. The rotation of the shaft 22 is transmitted through the drag chain 32 to the beet puller or lifter 20 which is thereby caused to rotate, also in a counter clockwise direction as viewed in Figure 1. As the machine is pulled along and the chain 32 driven, as just indicated, the arms on the beet puller 20 ride just under the surface of the ground and engage and remove the beets therefrom. Figure 1 shows one pair of arms just coming into engagement with a beet still in the ground while the next forward pair of arms is illustrated as supporting and raising a beet which has just been pulled or lifted from the ground. Further rotation of the beet lifter 20 raises the beet still further so that it can be engaged by the pins 33 on the drag chain 32. The motion of the latter then elevates the beets to the upper part of the elevator frame 12. The chain 32 and the arms or pins 33 are so timed in relation to the rotation of the beet lifter 20 that as each beet is lifted into a position where it is engaged by the drag chain 32, the pins 33 are in position to convey the beet in an upward direction.

A draft link 50 is securely fixed to the elevator frame 12 and extends forwardly and is provided with a loop 51 which is engageable with the draft bar 2 of the tractor 1. While I have shown the draft link 50 as connected with the elevator frame 12, it is to be understood that it is within the purview of my invention to connect the draft link 50 directly to the frame 5 if found to be desirable or feasible.

Extending longitudinally of the frame 5 and positioned below and mainly in rear of the upper portion of the elevator frame 12 is a conveyor especially formed in accordance with the present invention and which I prefer to term a revolving table. A portion of the revolving table extends underneath the upper portion of the elevator frame 12 so as to be in position to receive beets conveyed up to and dropped over the upper end of the elevator 12 by the drag chain conveyor 32. As best shown in Figure 1, the revolving table comprises a series of interconnected links 60 certain of which have secured thereto upstanding side members 61 apertured to receive one end of each of the rods 62, the other end of each of the rods 62 being supported by substantially identical structure. The links 60 form, in effect, a chain at each side of the harvester, and each chain is trained over a pair of sprocket wheels 64 journaled in a horizontal supporting member 65, best indicated in Figure 1. The sprockets 64 at each end of the harvester are secured to operating shafts 67 and 68, these shafts being journaled in the ends of the two supporting members 65.

As shown in Figure 1, each of the side members 61 supports the rods 62 so as to form a slotted trough of the proper dimension to receive and retain a beet, and the rods 62 are spaced apart a sufficient distance to allow dirt and other material to fall therethrough. It may also be desirable to agitate the revolving table structure, and for that purpose I provide a pair of eccentrically disposed sprocket wheels 70 journaled in any desired manner to the supporting members 65. These sprockets 70 are engaged and driven by the links 60 at each side of the revolving table framework and, being eccentrically disposed, they impart to the troughs an up and down motion which jars dirt, clods, soil and the like from the beets and in this way effectively cleans them.

As thus shown in Figure 3, the revolving table structure is disposed at an angle transversely of the machine and so arranged laterally that normally the beet will drop with the crown first inside of a guard rail 72. The oscillations imparted by the sprockets 70 to the revolving table structure causes the beets to be moved down against the rail 72 if any did not fall against it. The guard rail 72 is secured in any desired manner to the framework of the revolving table structure, as by means of brackets 73, best shown in Figure 3.

Figure 4:
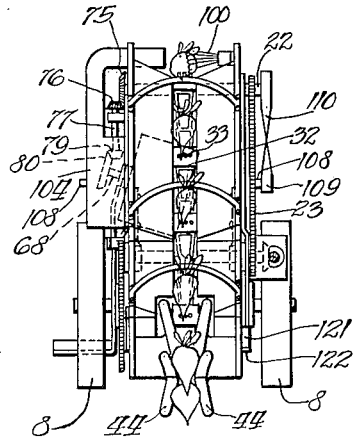
Figure 4 is a front view of my improved beet harvester and corresponds to a view taken along the line 4—4 of Figure 1.

The revolving table structure is driven by means of a beveled gear arrangement deriving its power from the upper shaft 22 of the elevator frame 12. As best shown in Figure 4, the end of shaft 22 opposite the driving chain 23 is provided with a bevel gear 75 meshing with a pinion 76 carried on the upper end of a short shaft 77, the lower end of which is provided with a second pinion 79 meshing with a bevel gear 80 secured to one end of the forward shaft 68 of the revolving table structure. Preferably, the short shaft 77 is formed of telescoping sections for a purpose to be later described.

It will thus be clear that as the power take-off shafts 3 and 18 are operated, the drive chain 23 rotates the shaft 22 which, through the beveled gearing just described, drives the shaft 68 of the revolving table structure. Since the forward sprockets 64 are secured to the shaft 68, the links 60 and the beet receiving troughs are driven, the troughs moving rearwardly of the upper end of the conveyor 12. The gearing just described is so arranged that one of the troughs comes directly under the upper end of the elevator 12 just as the drag chain 32 pushes a beet over the top of the elevator. The beet thus falls directly into one of the troughs of the revolving table.

As the troughs progress rearwardly, each conveying rearwardly a beet, it is desirable that the tops and crowns of the beets be removed, in accordance with the requirements of the sugar beet industry. The improved mechanism I have provided for conveying the beets is seen to comprise a revolving knife 78 journaled at one side of the harvester upon a bracket 79a, as best indicated in Figure 3 of the drawings. Preferably, the revolving knife 78 is driven by means of a belt or chain 80a from a pulley or sprocket 81 secured to one end of a transverse shaft 82 journaled upon the frame 5 and to the other end of which a bevel gear 84 is connected. Meshing with the bevel gear 84 is a pinion 86 secured to the lower end of a verticlly extending shaft 87 which, like shaft 77, is preferably formed of two telescoping sections, and to the upper end of which is a pinion 88 meshing with a gear 90 secured to and driven by the rear shaft 67 of the revolving table structure. Thus the shaft 82 and associated structure is driven by the shaft 67.

The shaft 82 is also utilized to drive a conveyor 94 of the usual type. Since the particular form of the conveyor 94 forms no part of the present invention, it is believed unnecessary to describe in detail this structure. Suffice it to say that the conveyor 94 comprises a movable apron supported at its upper end upon a shaft or roller structure and supported at its lower end from driving gears or rolls movable with the shaft 82. Thus as the revolving table 70 is actuated and the beets are discharged therefrom at the rear end they are received by the conveyor 94 and conveyed rearwardly where they may be deposited in a wagon or truck which preferably trails the beet harvester.

The conveyor 94 is preferably braced by supporting rods or link means 95 connected at their outer ends to the conveyor structure and at their inner ends to the framework of the harvester.

It was pointed out above that the revolving table structure is inclined laterally and so arranged that the beets are received or work their way against the guard rail 72. These parts are so arranged that the oscillations imparted to the revolving table by the eccentric sprockets 70 cause the tops to overlie the side rail 72 so that by the time the beets reach the position of the knife 78 they are in position to be severed from the beets. Preferably I arrange the knife 78 just inside the guard rail 72 so that the tops of the beets are severed at the proper point.

In order to insure that the beet tops will overlie the guard rail 72 and in proper position to be severed by the revolving knife 78, I provide a structure comprising a series of hooks 100 arranged in fan-shape and pivoted to move above a vertical axis as best shown in Figures 4 and 5. The fan-shaped hook member 100 is biased by means of a coil spring 101 to extend laterally of the machine with the hooks in position to engage and catch upon the beet tops as the beets reach the upper part of the elevator 12. I may also provide a blower structure 104 mounted on the elevator 12 and having an upwardly directed spout 105 terminating in a lateral nozzle 106 arranged to direct a blast of air against the beet tops so as to cause the same to engage the hooks 100 as well as to be blown laterally to occupy a position where the tops will be most likely to fall upon and overlie the guard rail 72. The fan or blower mechanism 104 includes a shaft 108 extending transversely of the elevator 12 and having at the end opposite the blower 104 a belt pulley 109 driven by a belt 110 trained over a second pulley 111 knotted on shaft 22 adjacent the driving chain 23.

At one side of the harvester I provide an operator's platform 120 upon which the operator of a machine may stand, and at the other side of the harvester I provide a hopper 121 having an open top to receive the tops of the beets. The bottom of the hopper 121 preferably is arranged in the form of a pivoted member 122 having a lateral extension 123 and hinged, as at 124, to one wall of the hopper 121. The lateral extension 123 is connected to a lever 125 having an operating pedal 126 and extending into proximity to the operator's platform 120 and so arranged that depression of the pedal 126 will cause the hopper bottom 122 to swing downwardly to discharge the quantity of beet tops accumulated in the hopper 121. If desirable, a spring 127 may be provided to hold the bottom 122 closed under normal conditions. It is to be understood, however, that any other form of holding means, such as latches and the like, may be employed to hold the bottom member 122 closed when the machine travels across the field. Preferably, the tops are periodically dumped upon the field in piles so they are conveniently accessible and may be utilized for any purpose desirable.

As has already been pointed out, the lower elevator structure 16 is hinged to the upper elevator structure 12, and this is for the purpose of raising and lowering the beet lifter or puller to and from inoperative position. In order that this may be easily accomplished I provide a lever and link structure extended into a position for convenient operation from the operator's platform 120. This structure preferably comprises an operating lever 132 pivoted at 133 to one of the frame members 9 and connected by means of a link 134 with the lower elevator structure 16. A latch or other equivalent means 136 is bolted on the frame 5 of the harvester and in a position to engage and hold the lever 132 in its lower position which, in turn, holds the beet lifter or puller 20 in elevated or inoperative position. This raising and lowering of the beet puller 20 does not, however, effect the operation of the drag chain 32 although, as a matter of fact, the chain 32 is not usually operated when the beet puller is in its inoperative position. The lower elevator structure 16 is prevented from pivoting too far downwardly, that is, in a clockwise direction as viewed in Figure 1, by the abutting portions 138 and 139 formed respectively on the upper and lower elevator structures 12 and 16.

Under certain conditions it may be desirable or necessary to adjust the vertical position of the revolving table relative to the upper end of the elevator 12. In order that this may be easily accomplished, I preferably support the frame members 65 and associated structure upon the main frame of the harvester by means of bolts or the like. A plurality of holes 141 are provided in the uprights 6 for securing the revolving table structure in a number of adjusted positions. The telescoping connection afforded by the shafts 77 and 87 allows the revolving table to be adjusted without affecting its driving connections, and the bevel gear connections associated with these shafts are arranged to permit the small amount of relative movement required in this adjustment. Figure 1 shows the manner of adjustably securing the revolving structure to the uprights 6, and it is to be understood that the revolving table structure may be supported at the other side by the same or similar means.

The operation of my improved harvester is believed to be obvious from the above description. As the machine is pulled along by the tractor 1, the mechanism of the harvester is driven by virtue of the power take-off connection with the motor of the tractor, and as the machine is drawn along the beet lifter 20 rotates at sufficient speed so that each beet is lifted from the ground by its engagement with the V-shaped pairs of lifting arms 44. As the arms raise each beet from the ground it is engaged by the pins 33 on the drag chain 32 whereby the beets are elevated upwardly and eventually into a position where the tops are directed to one side by the blast of air from the blower 104 and into engagement by the hook member 100. The beet falls downwardly and is received by one of the troughs of the revolving table structure while the top of each beet is retarded by its engagement with the hook member 100 and deflected by the blast of air so that each top is wholly or partially overlying the guard rail 72. The revolving table structure is oscillated by the sprockets 70 so that dirt, clods and the like fall from the beets and between the rods 62 onto the ground, the oscillation or jarring of the revolving table causing the beets to slide or move down against the guard rail so that by the time the beets reach the revolving knife 78 they are in position to be properly topped. In the event that one or more of the beets does not reach exactly the proper place for this operation it is a simple matter for the operator standing on the operator's platform 120 to adjust the position of the beet by hand. Furthermore, the operator is in position to carefully observe all parts of the machine and see that they function in a proper manner. As the tops are removed by the knife 78 they fall downwardly, see Figure 1, into the hopper 121 where they are accumulated and from which they are periodically dumped by the operator by depressing the pedal 126 on the end of the operating lever 125. The topped beets are conveyed rearwardly and received upon the conveyor 94 which elevates them and drops them into a wagon or truck following the harvester.

While I have shown and described one preferred embodiment of the present invention, it is to be understood that the specific structure shown and described is only one of many constructions which come within the purview of my invention. For example, where I have shown gearing, belts and the like for driving the various component parts of my harvester, it is to be understood that any other equivalent means may be employed to secure the same results. Furthermore, where I have shown front supporting wheels 8 and rear caster wheels 10 it is to be understood that the caster wheels may be placed in front or, if desired, only two supporting wheels may be employed if desired. It is thus clear that means widely different from that shown and described may be employed in the practice of the broader aspects of my invention.

What I claim, therefore, and desire to secure by Letters Patent is:

1. A beet harvester comprising a wheeled frame, a revolving beet lifter adapted to engage and raise the beets from the ground, separate conveyor means to elevate the beets and to move them along said frame, common means for driving the revolving beet lifter and the separate conveyor means, means to remove the tops from the beets, and conveyor means to receive the beets therefrom.

2. A beet harvester comprising a wheeled frame, a revolving beet lifter adapted to engage and raise the beets from the ground, said lifter comprising a plurality of rigid arms and shaft means supporting the same, means for driving said lifter, conveyor means adapted to receive the beets from said arms and to elevate the beets and to move them along said frame, means to remove the tops from the beets, and means to raise and lower said lifter to and from inoperative position.

3. A beet harvester comprising a wheeled frame, a revolving beet lifter adapted to engage and raise the beets from the ground, said lifter comprising a plurality of removable arms extending in outwardly diverging relationship and shaft means supporting the same, means for driving said lifter, conveyor means arranged to receive the beets as they are removed from the ground by said arms and to elevate the beets and to move them along said frame, means to drive the conveyor means from the means which drives the beet lifter, means to remove the tops from the beets, and conveyor means to receive the beets therefrom.

4. A beet harvester comprising a frame, means for removing the beets from the ground, conveyor means to elevate the beets, a revolving table to receive the beets as they are dropped from the conveyor means, said table comprising a plurality of slotted troughs each adapted to receive a beet, cutter mechanism to remove the tops of the beets as they are moved rearwardly with said table, and means to receive the beets from said table.

5. A beet harvester comprising a frame, means for removing the beets from the ground, conveyor means to elevate the beets, a revolving table to receive the beets as they are dropped from the conveyor means, said table comprising a plurality of slotted troughs flexibly connected together, each shaped to receive and support a beet, means to vibrate the troughs to remove dirt from the beets, cutter mechanism to remove the tops of the beets as they are moved rearwardly with said table, and means to receive the beets from said table.

6. A beet harvester comprising a frame, means for removing the beets from the ground, conveyor means to elevate the beets, a revolving table to receive the beets as they are dropped from the conveyor means, means movably supporting said table on said frame for adjustment relative to said conveyor means, cutter mechanism to remove the tops of the beets as they are moved rearwardly with said table, and means to receive the beets from said table.

7. A beet harvester comprising a wheeled frame, a revolving beet lifter adapted to engage and raise the beets from the ground, conveyor means to elevate the beets, a revolving table to receive the beets as they are dropped from the conveyor means, said table moving longitudinally rearwardly of said frame, cutter mechanism to remove the tops of the beets as they are moved rearwardly with said table, hopper means on the frame to receive said tops, and means to receive the beets from said table.

8. A beet harvester comprising a wheeled frame, a revolving beet lifter adapted to engage and raise the beets from the ground, conveyor means to elevate the beets and to move them along said frame, means to remove the tops from the beets, and hopper means on the frame to receive said tops, said hopper having a movable dumping bottom and foot operated means for shifting said bottom.

9. A beet harvester comprising a frame, means for removing the beets from the ground, conveyor means to elevate the beets, a revolving table to receive the beets as they are dropped from the conveyor means, said revolving table being inclined laterally, a guard rail against which the beets are received, cutting mechanism for removing the beet tops when the beet is against said rail, hopper means on the frame to receive said tops, and means to receive the beets from said table.

10. A beet harvester comprising a frame, means for removing the beets from the ground, conveyor means to elevate the beets, a revolving table to receive the beets as they are dropped from the conveyor means, said revolving table being inclined laterally, a guard rail against which the beets are received, cutting mechanism for removing the beet tops when the beet is against said rail, an operator's platform secured to the frame adjacent said revolving table and opposite said cutter mechanism, whereby an operator can manually position the beets relative to said mechanism, hopper means on the frame to receive said tops, and means to receive the beets from said table.

11. A beet harvester comprising a frame, means for removing the beets from the ground, conveyor means to elevate the beets, a revolving table to receive the beets as they are dropped from the conveyor means, said revolving table being inclined laterally, a guard rail against which the beets are received, a cutter mechanism for removing the beet tops when the beet is against said rail, an operator's platform secured to the frame adjacent said revolving table and opposite said cutter mechanism whereby an operator can manually position the beets relative to said mechanism, hopper means on the frame to receive said tops, said hopper having a movable dumping bottom and foot actuated means operable from said platform for shifting said bottom, and means to receive the beets from said table.

12. A beet harvester comprising a frame, means for removing the beets from the ground, conveyor means to elevate the beets, a revolving table to receive the beets as they are dropped from the conveyor means, said revolving table being inclined laterally, a guard rail against which the beets are received, means restraining the leaves of the beets as they fall onto said table whereby the leaves fall toward said guard rail, means to impart vibration to said table to cause said leaves to overlie said rail, cutter mechanism for removing the beet tops and leaves, and means to receive the beets from said table.

13. A beet harvester comprising a wheeled frame, means for removing beets from the ground, conveyor means to receive and elevate said beets, means to receive the beets from said last mentioned means as they are dropped therefrom, pivoted hook means adapted to yieldingly engage the leaves of said beets so as to cause them to fall with the leaves in a transverse direction, blower means cooperating with said hook means, and cutter mechanism for removing the tops and leaves from the beets.

14. A beet harvester comprising a wheeled frame, means for removing beets from the ground, conveyor means to receive and elevate said beets, a revolving table to receive the beets as they are dropped from the conveyor means, pivoted hook means adapted to yieldingly engage the leaves of said beets so as to cause them to fall with the leaves in a transverse direction, blower means cooperating with said hook means and operating to spread the leaves, a guard rail against which the beets are received, said rail being interrupted and cutter mechanism interposed therein for removing the tops and leaves of the beets, and conveyor means to receive beets from the revolving table and convey them to a beet receiving container.

15. A beet harvester comprising, in combination, a tractor having a power take-off, a wheeled frame, a revolving beet lifter having a plurality of beet lifting arms, means for driving said lifter from the power take-off, conveyor means to elevate the beets, a revolving table to receive the beets as they are dropped from the conveyor means, said table being inclined laterally, cutter mechanism on the lower side of said table for removing the tops and leaves from the beets, a hopper on one side of the frame for receiving said tops and leaves, an operator's platform on the opposite side of the frame and provided with means for dumping said hopper means for imparting vibration to said table, and means for receiving the beets from said table.

16. In a beet harvester, in combination, a wheeled frame, a revolvable beet lifter journaled on the frame and comprising a shaft and a plurality of spaced apart arms arranged to penetrate soil and engage and remove the beets, means to drive said beet lifter, and conveyor means operating between said arms to receive the beets therefrom comprising a drag chain in driving engagement with said beet lifter.

17. In a beet harvester, in combination, a wheeled frame, a revolvable beet lifter journaled on the frame and comprising a shaft and a plurality of V-shaped arms arranged to penetrate the soil and engage and remove the beets, a sprocket on said shaft between said arms, and conveyor means operating between said arms and including a chain trained over said sprocket and provided with plates secured thereto and acting to move the beets upwardly.

18. In a beet harvester, in combination, a wheeled frame, a revolvable beet lifter journaled on the frame and comprising a shaft and a plurality of arms arranged to penetrate the soil and engage and remove the beets, conveyor means in the form of a drag chain operating between said arms, means to drive the drag chain including a second shaft, and means to drive the revolvable beet lifter from said first shaft.

19. A beet harvester comprising, in combination a wheeled support, a forwardly extending elevator frame carried thereby, a drag chain operating in said elevator frame, transverse shafts at the upper and lower ends of said frame, sprocket means on the upper shaft over which the drag chain is trained, separate means for driving the upper shaft from the lower shaft, an adjustable elevator frame mounted for swinging movement on the lower end of said first named elevator frame and provided with a transverse shaft at its lower end, means driving said last named shaft from said lower shaft, and a rotatable beet pulling device on said last named shaft, said drag chain receiving the beets removed from the ground by said pulling device.

In witness whereof, I hereunto subscribe my name this 13th day of Sep., 1930.

FRED MARYOTT.